(12) United States Patent
Slattery

(10) Patent No.: US 9,333,702 B2
(45) Date of Patent: May 10, 2016

(54) LINEAR FRICTION WELDING MACHINE AND ASSOCIATED METHOD

(71) Applicant: The Boeing Company, Chicago, IL (US)

(72) Inventor: Kevin Thomas Slattery, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 606 days.

(21) Appl. No.: 13/690,845

(22) Filed: Nov. 30, 2012

(65) Prior Publication Data

US 2014/0150955 A1 Jun. 5, 2014

(51) Int. Cl.
*B32B 37/00* (2006.01)
*B29C 65/06* (2006.01)
*B23K 20/12* (2006.01)

(52) U.S. Cl.
CPC ......... *B29C 65/0618* (2013.01); *B23K 20/1205* (2013.01); *Y10T 156/17* (2015.01)

(58) Field of Classification Search
CPC .... B23K 20/12; B23K 20/1205; B29C 65/06; B29C 65/0609; B29C 65/0618
USPC ......... 156/64, 73.5, 73.6, 378, 538, 556, 580; 228/2.1, 112.1
See application file for complete search history.

(56) References Cited

U.S. PATENT DOCUMENTS

| 5,813,593 | A | 9/1998 | Galaske, Jr. |
| 6,779,708 | B2 * | 8/2004 | Slattery ............ 228/112.1 |
| 6,910,616 | B2 | 6/2005 | Halley et al. |
| 7,009,595 | B2 | 3/2006 | Roberts et al. |
| 7,083,076 | B2 | 8/2006 | Slattery |
| 7,128,948 | B2 | 10/2006 | Slattery |
| 7,156,276 | B2 | 1/2007 | Slattery |
| 7,225,967 | B2 | 6/2007 | Slattery |
| 7,347,351 | B2 | 3/2008 | Slattery |
| 7,353,978 | B2 | 4/2008 | Slattery et al. |
| 7,381,446 | B2 | 6/2008 | Slattery |
| 7,398,911 | B2 | 7/2008 | Slattery et al. |
| 7,431,194 | B2 | 10/2008 | Slattery |
| 7,614,539 | B2 | 11/2009 | Sankaran et al. |
| 7,669,750 | B2 | 3/2010 | Slattery et al. |
| 7,841,504 | B2 | 11/2010 | Slattery et al. |
| 7,854,363 | B2 | 12/2010 | Slattery et al. |
| 7,891,535 | B2 | 2/2011 | Slattery et al. |

(Continued)

OTHER PUBLICATIONS

International Search Report and Written Opinion for Application No. PCT/US2013/061782 dated Mar. 7, 2014.

*Primary Examiner* — James Sells
(74) *Attorney, Agent, or Firm* — Alston & Bird LLP

(57) ABSTRACT

A linear-friction-welding machine and a method of linear friction welding are provided which permit continuous clocking or angular positioning between a pair of workpieces without the complexity and cost associated with making either the weld head or the table of the friction-stir-welding machine rotatable. The linear-friction-welding machine may include a stationary or a movable table, a weld head, and a tapered cylindrical collet, adapted to engage a tapered cylindrical opening of a socket. The socket is either supported by the table or retained by the weld head, to permit controlled, continuous clocking of one of the workpieces, retained by the collet, relative to the other workpiece, which is either supported by the table or retained by the weld head such that the workpieces may be mutually biased and linearly oscillated relative each other.

19 Claims, 4 Drawing Sheets

(56) References Cited

U.S. PATENT DOCUMENTS

| | | |
|---|---|---|
| 7,946,469 B2 | 5/2011 | Slattery et al. |
| 8,177,113 B2 | 5/2012 | Slattery |
| 8,302,450 B2 | 11/2012 | Slattery et al. |
| 8,316,687 B2 | 11/2012 | Slattery |
| 8,323,427 B1 | 12/2012 | Slattery et al. |
| 2004/0094604 A1 | 5/2004 | Halley et al. |
| 2007/0084905 A1 | 4/2007 | Slattery et al. |
| 2008/0185420 A1 | 8/2008 | Swallow et al. |
| 2010/0170996 A1 | 7/2010 | Sankaran et al. |
| 2011/0158759 A1* | 6/2011 | Jansen et al. .................. 409/234 |

* cited by examiner

LINEAR FRICTION WELDING MACHINE AND ASSOCIATED METHOD

TECHNOLOGICAL FIELD

An example embodiment of the present disclosure relates generally to friction welding and, more particularly, to linear-friction-welding machines and associated methods of operation.

BACKGROUND

To join workpieces using linear friction welding, the workpieces must be urged toward one another, while at least one of the workpieces is oscillated relative to the other workpiece. To appropriately position the workpieces with respect to one another and to provide the biasing force and the oscillating motion required to weld the workpieces together, linear-friction-welding machines have been developed.

Conventional single-axis linear-friction-welding machines generally include a stationary table for supporting a first workpiece and a weld head for biasing a second workpiece against the first workpiece and for providing a linear oscillation of the second workpiece relative to the first workpiece to friction weld the workpieces together. To permit the workpieces to be controllably positioned with respect to one another for welding, single-axis linear-friction-welding machines use part/weld-unique tooling.

Conventional three-axis linear friction welding machines generally include a table configured to be movable along a plane defined by two orthogonal axes, such as the X axis and the Y axis. For purposes of providing a biasing force between the two workpieces during the welding operation, the weld head may be configured to be movable along a third axis, orthogonal to the first two axes, e.g., the Z axis. The movable table may be translated along the X-Y plane to generally align the first workpiece, supported by the movable table, with the second workpiece, coupled to the weld head, along the Z axis. The weld head may then be positioned along the Z-axis to bias the second workpiece against the first workpiece with a predetermined force, while linearly oscillating the second workpiece relative to the first workpiece at a predetermined frequency, thereby friction welding the workpieces together.

In many instances, it is desirable to position the first and second workpieces at orientations other than parallel or perpendicular to each other. To provide relative clocking (angular positioning) of the workpieces, a linear-friction-welding machine having either a stationary or a movable table could be reconfigured to allow rotation of the table relative to the weld head. However, if the movable table were configured to be rotatable, the linear-friction-welding machine would need to be substantially larger, heavier, and more complex to accommodate angular positioning of large workpieces. Alternatively, the weld head of a linear-friction-welding machine, which has either a stationary or a movable table, may be configured to be rotatable relative to the table. Still, a rotatable weld head would also be more complex and, accordingly, heavier, thereby increasing the mass that must be oscillated to perform the linear-friction-welding operation. Not only would a larger oscillating mass be likely to increase power consumption, but the linear-friction-welding machine would now require a heavier construction to maintain the stiffness needed to oscillate the larger mass.

BRIEF SUMMARY

Examples of a linear-friction-welding machine and a method of linear friction welding, according to the present disclosure, permit continuous (rather than merely incremental) clocking or angular positioning between a pair of workpieces without the complexity and cost associated with making either the weld head or the table of the friction-stir-welding machine rotatable. The linear-friction-welding machine, according to one or more aspects of the disclosure, may include a stationary or a movable table, a weld head, and a tapered cylindrical collet, adapted to engage a tapered cylindrical opening of a socket. The socket is either supported by the table or retained by the weld head, to permit controlled, continuous clocking of one of the workpieces, retained by the collet, relative to the other workpiece, which is either supported by the table or retained by the weld head such that the workpieces may be mutually biased and linearly oscillated relative each other.

In one embodiment, a two-axis linear-friction-welding machine includes a stationary table configured to support a first workpiece. The linear-friction-welding machine also includes a weld head configured to be generally aligned with the stationary table along a direction orthogonal to the table. "Along", as used herein, means on or parallel to a line, a plane, or a portion thereof for the entirety of that line, plane, or portion thereof. The weld head controllably positions a second workpiece along an axis orthogonal to the stationary table, such that the workpieces may be mutually biased to produce a preload force necessary for linear friction welding. Part/weld-unique tooling may be used to achieve specific alignment between the workpieces. The weld head is configured to linearly oscillate the second workpiece in a direction along a plane defined by the stationary table. Either the weld head or the stationary table includes a socket defining a tapered cylindrical opening. The linear-friction-welding machine also includes a collet configured to retain one of the workpieces. The collet has a tapered cylindrical shape and is configured to be at least partially received within the tapered cylindrical opening defined by the socket. The socket and the collet have a symmetry axis located along the axis orthogonal to the stationary table. Accordingly, the collet may be clocked in any angular position relative to the socket about the symmetry axis to achieve a desired angular orientation between the workpieces.

In another embodiment, a four-axis linear friction welding machine includes a movable table adapted to support and controllably position a first workpiece along a plane, e.g., an X-Y plane, defined by first and second linear axes, e.g., an X axis and a Y axis. The linear-friction-welding machine also includes a weld head, adapted to controllably position a second workpiece along a third axis, e.g., a Z axis, orthogonal to the first and the second axes, such that the workpieces may be mutually biased to produce a preload force necessary for linear friction welding. The movable table may be translated along the X-Y plane to align the first workpiece and the second workpiece. At least one of the weld head and the movable table is configured to linearly oscillate in a direction along the X-Y plane. Either the weld head or the movable table includes a socket defining a tapered cylindrical opening. The linear-friction-welding machine of this embodiment also includes a collet adapted to retain one of the workpieces. The collet has a tapered cylindrical shape and is configured to be at least partially received within the tapered cylindrical opening defined by the socket. The socket and the collet have a symmetry axis located along the Z axis. Accordingly, the collet may be clocked in any angular position relative to the socket about the symmetry axis to achieve a desired angular orientation between the workpieces.

In one embodiment, a collet is provided that includes a body extending from a first end to an opposed second end.

The body of the collet defines a tapered cylindrical shape, such as a frustoconical shape that tapers down from the first end to the opposed second end. The collet also includes a plurality of jaws proximate the first end of the body. The plurality of jaws are configured to be controllably positioned relative to one another so as to engage and securely hold a workpiece. The collet may also include a collar configured to be threadably positioned relative to the body in order to controllably position the plurality of jaws relative to one another.

In another embodiment, an assembly is provided that includes a socket defining a tapered cylindrical opening and a tapered cylindrical collet configured to retain a workpiece. In one embodiment, the tapered cylindrical opening defined by the socket has a frustoconical shape and the tapered cylindrical collet has a frustoconical shape. The collet is adapted to engage the tapered cylindrical opening defined by the socket so as to permit controlled, continuous clocking of the workpiece retained by the collet relative to the socket. The socket and the collet may define a symmetry axis such that the collet is configured to permit clocking of the workpiece retained by the collet to any angular position relative to the socket about the symmetry axis.

In a further embodiment, a method of joining two workpieces using linear friction welding is provided. The method includes clamping one of the workpieces in a collet. The method also includes positioning the collet, which has a tapered cylindrical shape, at least partially within a tapered cylindrical opening defined by a socket associated with either a weld head or a stationary table. The method further includes aligning the two workpieces by using part/weld-unique tooling to controllably position either the socket together with the collet retaining one of the workpieces or the other one of the workpieces relative to the weld head. The method also includes clocking the collet relative to the socket to achieve a desired angular orientation between the workpieces. The method of this embodiment further includes controllably positioning the weld head and the workpiece retained thereby along an axis, orthogonal to the stationary table, to bias the two workpieces against each other. Further, the method of this embodiment includes linearly oscillating the weld head in a direction along a plane defined by the stationary table, to friction weld the workpieces together. Accordingly, the socket and the collet received therein may be aligned along an axis perpendicular to the stationary table, and the collet may be clocked in any angular position relative to the socket, thus allowing any desired angular orientation between the two workpieces without the need for rotating either the table or the weld head.

In yet another embodiment, a method of joining two workpieces using linear friction welding is provided. The method includes clamping one of the workpieces in a collet. The method also includes positioning the collet, which has a tapered cylindrical shape, at least partially within a tapered cylindrical opening defined by a socket associated with either a weld head or a movable table. The method further includes aligning the workpieces by translating a movable table along a plane defined by first and second orthogonal axes to controllably position either the socket together with the collet retaining one of the workpieces or the other one of the workpieces relative to the weld head. The method also includes clocking the collet relative to the socket to achieve a desired angular orientation between the workpieces. The method of this embodiment further includes controllably positioning the weld head and the workpiece retained thereby along a third axis, orthogonal to the first and second axes, to bias the two workpieces against each other. Further, the method of this embodiment includes linearly oscillating at least one of the weld head and the movable table in a direction along the plane defined by the first and the second orthogonal axes, to friction weld the workpieces together. Accordingly, the socket and the collet received therein may be aligned along the third axis, perpendicular to the first and the second orthogonal axes, and the collet may be clocked in any angular position relative to the socket, thus allowing any desired angular orientation between the two workpieces without the need for rotating either the table or the weld head.

BRIEF DESCRIPTION OF THE SEVERAL VIEWS OF THE DRAWINGS

Figure 1:
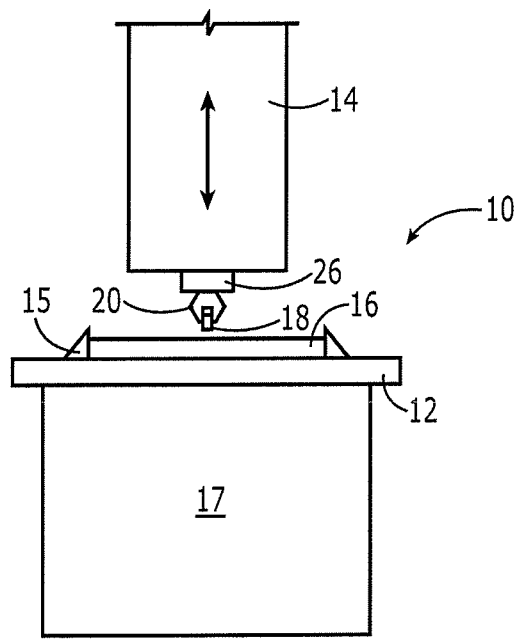
Figure 1A:
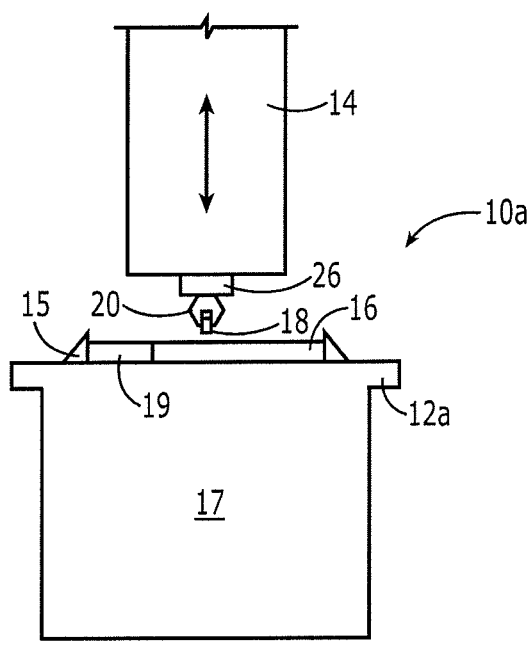
Figure 2:
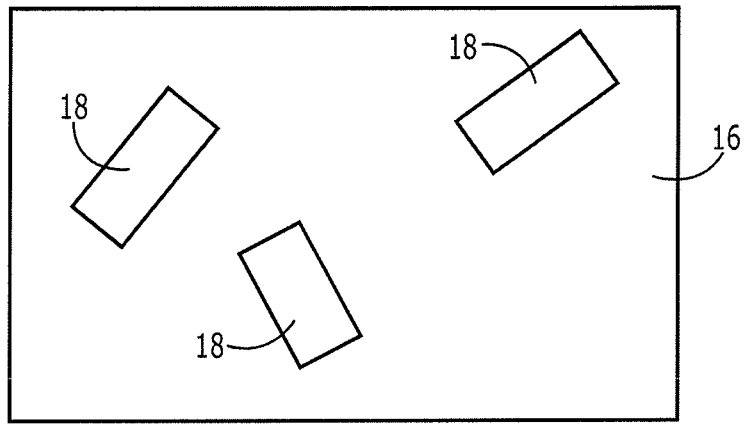
Figure 3:
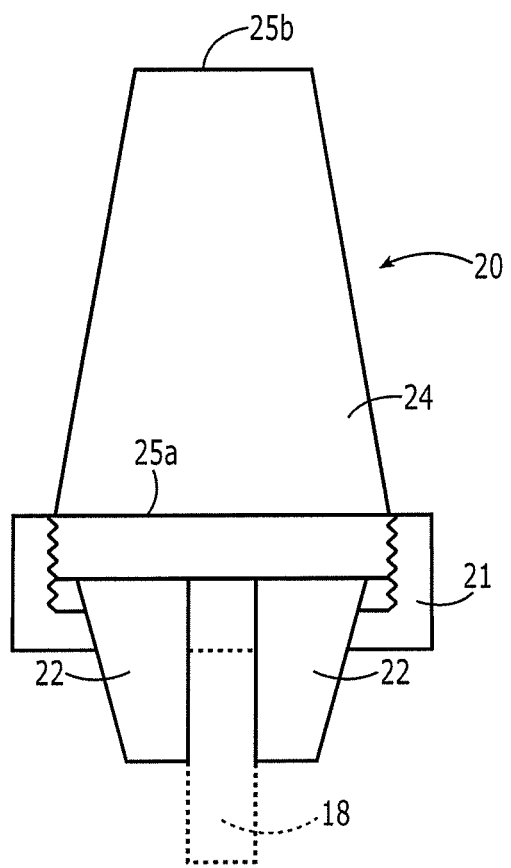
Figure 4:
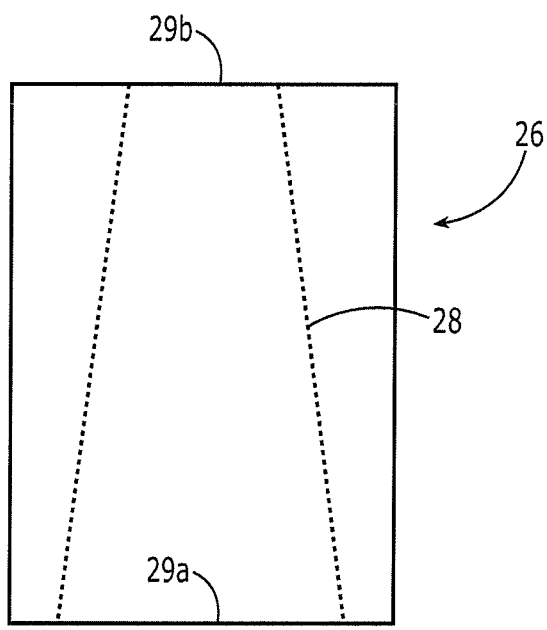
Figure 5:
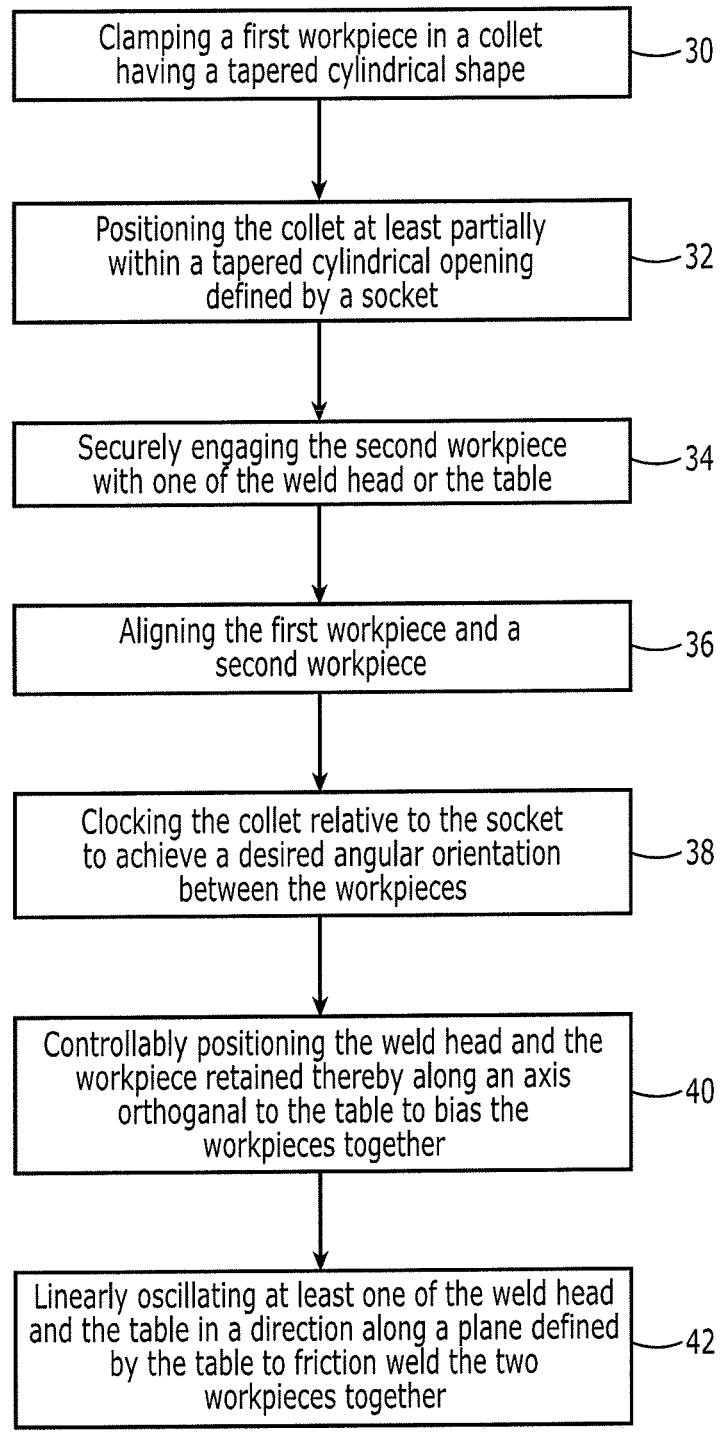

Having thus described certain embodiments of the present disclosure in general terms, reference will now be made to the accompanying drawings, which are not necessarily drawn to scale, and wherein:

FIG. 1 is a schematic representation of a linear friction welding machine having a movable table;

FIG. 1A is a schematic representation of a linear friction welding machine having a stationary table;

FIG. 2 is a schematic representation of a plurality of second workpieces having different angular orientations relative to a first workpiece;

FIG. 3 is a side view of a collet in accordance with one embodiment of the present disclosure;

FIG. 4 is a side view of a socket for at least partially receiving a collet in accordance with one embodiment of the present disclosure; and FIG. 5 is a flow chart illustrating operations performed in accordance with one embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may take many different forms and should not be construed as limited to the examples set forth herein; rather, these embodiments are provided so that this disclosure will satisfy applicable legal requirements. Like numbers refer to like elements throughout.

Referring now to FIG. 1, a linear-friction-welding machine 10 is depicted. The linear-friction-welding machine 10, according to one aspect of the disclosure, includes a table 12 and a weld head 14. The table 12 is movable and is configured to securely support a first workpiece 16, such as by secure attachment of the first workpiece to the table by a vice 15 or the like. The movable table may, in turn, be supported by a base or pedestal 17 that is fixed in position and also supports the weld head 14. For example, the base may be coupled to the weld head 14 by a C-frame or by a plurality of posts (not shown). While illustrated as a generally planar workpiece, the first workpiece 16 may have a variety of different shapes and sizes, depending upon the application. The table 12 is configured to be movable along a plane defined by first and second orthogonal axes, e.g., the X and Y axes, for controllably positioning the first workpiece 16 along, e.g., the X-Y plane. "Along", as used herein, means on or parallel to a line, a plane, or a portion thereof for the entirety of that line, plane, or portion thereof. In the plane of FIG. 1, the X axis may extend laterally, such as left to right across the page, while the Y axis may extend into and out of the page. Thus, the movable table 12 may controllably position the first workpiece 16 along the X-Y plane so as to be generally aligned with the weld head 14.

The weld head 14 is configured to hold a second workpiece 18. Additionally, the weld head 14 is configured to be movable along a third axis, e.g., the Z-axis, orthogonal to the first two axes, e.g., the X and Y axes. Accordingly, the weld head 14 may be configured to be controllably positioned along the Z-axis, orthogonal to the X-Y plane. In the plane of FIG. 1, the Z-axis may extend upwardly and downwardly. Prior to linear friction welding the first and second workpieces 16 and 18, the movable table 12 may controllably position, e.g., along the X-Y plane, the first workpiece relative to the second workpiece held by the weld head 14 to provide general alignment between the workpieces along, e.g., the Z-axis. Those skilled in the art will appreciate that the above-described orientations of the workpieces and the components of the linear-friction-welding machine are only exemplary. For example, the weld head 14 may instead be arranged to be movable along the Y-axis, the X-axis, or another axis, with other components of the linear-friction-welding machine and the workpieces arranged accordingly.

An alternative linear-friction-welding machine, e.g., a linear-friction-welding machine 10a, illustrated in FIG. 1A, may include a stationary table 12a rather than a movable table 12. Part/weld-unique tooling 19, coupled to the table 12a or the weld head 14, may be used to permit the workpieces to be controllably positioned with respect to one another for welding.

To provide controlled angular positioning or clocking of the second workpiece with respect to the first workpiece, e.g., in the X-Y plane, as shown in FIG. 2, the exemplary linear-friction-welding machine may include a collet 20 having a body 24 that is configured to retain, e.g., the second workpiece. As shown in more detail in FIG. 3, the collet 20 is configured to engage and to securely hold the second workpiece 18. Although the collet 20 may be configured to engage and securely hold the second workpiece 18 in a variety of different ways, in one example, the collet may include a first and a second jaw members 22, adapted to be controllably positioned relative to the second workpiece, such as by threadable advancement or retraction of a collar 21 relative to the body 24 of the collet. As such, when the collar 21 is threadably retracted with respect to the body 24, the jaw members 22 of this embodiment may be spread sufficiently to facilitate the insertion of, e.g., the second workpiece 18 therebetween. The jaw members 22 may then be closed to engage the second workpiece 18, such as by threadably advancing the collar 21 relative to the body 24 of the collet, so as to securely hold the second workpiece therebetween.

As also shown in FIG. 3, the body 24 of the collet 20 has a tapered cylindrical shape. For example, the body 24 of the collet, which extends from a first end 25a proximate the jaw members 22 to an opposed end 25b, may have a tapered cylindrical shape, such as a frustoconical shape. In an instance in which the body 24 of the collet 20 has a tapered cylindrical shape, the tapered cylindrical shape may taper down from the first end 25a to the opposed end 25b at any of a variety of different angles, such as at 5° in one embodiment. Additionally, the body 24 of the collet 20 may have any of a variety of different lengths as measured between the opposite ends 25a, 25b, but, in one embodiment, the length of the body of the collet is about six inches (about fifteen centimeters).

In the illustrated embodiment, the collet 20 mates with a socket 26. The socket 26 may be securely engaged by, e.g., the weld head 14 and, in one embodiment, may be integral with the weld head. Alternatively, the socket 26 may be secured to the weld head 14 by one or more bolts and may therefore be replaceable. Those skilled in the art will appreciate that the socket may also be coupled to the table 12 or 12a.

The socket 26 is configured to engage and to hold the collet 20 during linear-friction-welding operations. The socket 26 defines an internal opening 28, as shown in FIG. 4, for receiving at least a portion of the body 24 of the collet 20 and, in one embodiment, a majority of the body of the collet. The opening 28 has a first end 29a and an opposed end 29b. While the entire body 24 of the collet 20 may be received within the opening 28 defined by the socket 26 in one embodiment, the opening defined by the socket of another embodiment is configured to receive at least 50% of the body of the collet, as measured in a lengthwise direction between the opposed ends 25a, 25b. In an embodiment in which the collet 20 has a tapered cylindrical shape, the socket 26 may also define an opening 28 having a correspondingly similar tapered cylindrical shape. In this embodiment, the tapered cylindrical opening 28 defined by the socket 26 may generally match the tapered cylindrical shape of the body 24 of the collet 20, such as by having the same general size, e.g., substantially the same diameter of the respective first ends 29a and 25a and the respective opposed ends 29b and 25a, and essentially the same taper angle, such that the body of the collet is snugly received within the opening defined by the socket and the biasing force exerted by the weld head 14 during welding operations serves to secure the collet in position within the socket. At a minimum, to ensure engagement between the socket 26 and the collet 20, the diameter of the first end 25a of the collet must be larger than the diameter of the opposed end 29b of the internal opening 28 of the socket, the diameter of the opposed end 25b of the collet must be smaller than the diameter of the first end 29a of the internal opening 28, and the overlap between the surfaces of the internal opening 28 of the socket and the collet 20 may include at least about 30% of the area of the internal opening 28. To achieve a wobble-free fit between the collet 20 and the socket 26, in one example the angular tolerance of taper of the internal opening 28 relative to the collet 20 may be +0.000/−0.005 (closing) degrees to compensate for possible bell-mouthing (increased taper) of the internal opening 28 over time.

As a result of the size and shape of the tapered opening 28 defined by the socket 26 and the tapered cylindrical shape of the body 24 of the collet 20 that has the same or similar size and shape, the body of the collet fits snugly within the socket so as to be securely retained by the socket during linear friction welding operations. Advantageously, the tapered cylindrical shapes of the body 24 of the collet 20 and the opening 28 defined by the socket 26 permit the collet and, therefore, the second workpiece 18, carried by the collet, to be positioned relative to the socket at any desired angular orientation. In this regard, the collet 20 may be angularly positioned relative to the socket 26 about an axis, such as the Z axis. For example, the collet 20 and the socket 26 may be aligned along a symmetry axis, e.g. the Z axis, such that the collet 20 may be clocked in any angular position relative to the socket about the symmetry axis. The tapered cylindrical shape of the body 24 of the collet 20 and the opening 28 defined by the socket 26 permits the collet of an exemplary embodiment to be clocked in any angular position relative to the socket by turning the collet about, e.g., the Z axis, relative to the socket prior to fully seating the collet within the socket, thereby permitting infinite angular adjustability of the collet and, in turn the second workpiece 18, relative to the socket.

Thus, any desired angular orientation of the second workpiece 18 with respect to the first workpiece 16 may be achieved. The collet 20 may be rotated relative to the socket 26 such that the second workpiece 18 carried by the collet has the desired relative position with respect to the first workpiece 16, such as may be determined by a feedback loop or a positioning mechanism. Once the collet 20 has been appropriately angularly positioned with respect to the socket 26, the body 24 of the collet may be inserted within the opening 28 defined by the socket such that the socket securely engages the collet and maintains the desired angular position of the second workpiece 18 with respect to the first workpiece 16 during linear friction welding operations. In one embodiment, for example, the collet 20 may define an indexing point that may be sensed by a robot or other insertion mechanism and utilized to angularly align the collet. Angular adjustability of the collet 20 with respect to the socket 26 allows the second workpiece 18 to be oriented in any desired angular position with respect to the first workpiece 16 Accordingly, the linear-friction-welding machine 10 having a movable table 12 is a four-axis linear friction welding machine that supports controlled positioning of the workpieces along four axes, that is, translation along the X, Y and Z axes as well as rotation about the Z axis in the X-Y plane. Similarly, the linear-friction-welding machine 10a having a stationary table 12a is a two-axis linear friction welding machine that supports controlled positioning of the workpieces along two axes, that is, translation along the Z axis as well as rotation about the Z axis in the X-Y plane. Moreover, the disclosed linear friction welding machines 10 and 10a, in one or more aspects thereof, permit the angular positioning of the second workpiece 18 with respect to the first workpiece 16 to be accomplished utilizing the tapered cylindrical collet 20 and socket 26, thus eliminating the need to configure the movable table 12, the stationary table 12a, or the weld head 14 to be rotatable. Accordingly, the overall weight, size and complexity of the linear-friction-welding machines 10 and 10a, according to one or more aspects of this disclosure, is minimized.

As shown in FIG. 5, a method for joining two workpieces, such as a second workpiece 18 and a first workpiece 16 using linear friction welding is illustrated. Although the blocks of FIG. 5 are illustrated and described below in an order or sequence, the operations described by a number of the blocks may be performed in a different order in other embodiments. As shown in block 30, one of the workpieces, such as the first workpiece 16, is clamped in the collet 20, which has a tapered cylindrical shape as described above. The collet 20 is positioned at least partially within a tapered cylindrical opening defined by a socket 26 as shown in block 32. The socket 26 may be associated with either a weld head 14 or a table. As shown in block 34, another workpiece, such as the second workpiece 18, is then securely engaged by the other of the weld head 14 or the table, that is, whichever of the weld head or the table that does not include the socket. For example, the second workpiece 18 may be securely attached to the table, such as by a vice, clamp or the like. The two workpieces are then aligned as shown in block 36. In an instance in which the table 12a is stationary, the two workpieces may be aligned by using part/weld-unique tooling to controllably position either the socket 26 together with the collet 20 retaining one of the workpieces or the other one of the workpieces relative to the weld head 14. Alternatively, in an instance in which the table 12 is movable, the two workpieces may be aligned by translating the movable table along a plane defined by first and second orthogonal axes.

As shown in block 38, the collet 20 is clocked relative to the socket 26 to achieve a desired angular orientation between the workpieces. The weld head 14 and the workpiece retained thereby are then controllably positioned, as shown in block 40, along an axis orthogonal to the table to bias the two workpieces together. In an instance in which the table 12 is movable, the weld head 14 and the workpiece retained thereby may be controllably positioned along a third axis, orthogonal to the first and second orthogonal axes. In one embodiment, the predetermined force exerted by the weld head 14 so as to urge the two workpieces into contact is about 15 ksi, although other levels of force may be applied in other embodiments. As shown in block 42 and while the two workpieces are biased together, the method also linearly oscillates at least one of the weld head 14 and the table in a direction along a plane defined by the table to friction weld the two workpieces together. For example, in an instance in which the table 12a is stationary, the weld head 14 may be linearly oscillated relative to the table. In one embodiment, the weld head 14 is configured to oscillate a workpiece back and forth over a predefined distance at a predefined frequency, such as back and forth over 2 to 3 mm at a frequency of about 40 Hz in one embodiment. However, the weld head 14 of other embodiments may oscillate one workpiece relative to the other workpiece by different distances and at different frequencies. Accordingly, the socket 26 and the collet 20 may be aligned along a symmetry axis located along the axis perpendicular to the table such that the collet may be clocked to any angular position relative to the socket, thus allowing any desired angular orientation between the two workpieces without requiring either the table or the weld head to rotate.

Following the linear friction welding, the collet 20 may release the workpiece that has been previously retained by the collet, such as by opening the jaw members 22 of the collet, and the weld head 14 may again be moved along the axis perpendicular to the table, albeit in the direction away from the table, in order to complete the linear friction welding operations. In one embodiment, the collet 20 may than be separated from the socket 26. For example, a punch, such as a pneumatic or hydraulic punch, may be positioned within the socket 26 in order to eject the collet 20 following the welding operations. Alternatively, the collet 20 may continue to engage the workpiece while the weld head 14 is moved along the axis perpendicular to the table, albeit in the direction away from the table. The continued engagement of the collet 20 with the workpiece may cause the collet to separate from the socket 26. The workpiece may then be released from the collet 20, such as by opening the jaw members 22 of the collet.

As such, the linear friction welding machine 10 and the associated method of one or more embodiments of the present disclosure may provide for the controllable positioning of two workpieces relative to one another, not only along the X, Y and Z axes, but also about the Z axis. Additionally, the linear friction welding machine and the associated method, according to one or more aspects of the present disclosure, permit the controlled relative positioning of the two workpieces in a manner that does not require the weld head 14 or the movable table 12 to be rotatable, thereby avoiding structural changes to the linear friction welding machine that may disadvantageously increase the size, weight and complexity of the linear friction welding machine.

Although the linear friction welding machine 10 is described above in conjunction with the weld head 14 being movable in the third direction and to be configured to oscillate in at least one of the first or second directions. In an alternative embodiment, the movable table 12 may be configured to be movable in the third direction and/or to oscillate in at least one of the first or second directions. In an embodiment in which the movable table 12 is configured to be movable in the third direction, the design of the weld head 14 may be simplified in that the weld head may, but need not be movable in the third direction. Similarly, in an embodiment in which the movable table 12 is configured to oscillate in the first or second directions, the design of the weld head 14 may be simplified in that the weld head may, but need not be configured to oscillate in the third direction.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A linear friction welding machine comprising:
a table configured to support a first workpiece;
a weld head configured to retain a second workpiece;
a socket supported by the table or retained by the weld head and defining a tapered cylindrical opening; and
a tapered cylindrical collet configured to retain one of the first or second workpieces, wherein:
the collet is adapted to engage the tapered cylindrical opening defined by the socket so as to permit controlled, continuous clocking of the one of the first or second workpieces retained by the collet relative to the other one of the first or second workpieces,
the tapered cylindrical opening comprises an interior surface that is inwardly tapered from a first end of the socket toward a second end of the socket, located opposite the first end, and
the tapered cylindrical collet is configured to be snugly received within the tapered cylindrical opening of the socket from the first end of the socket so as to be secured in the tapered cylindrical opening during a friction welding operation with a wobble-free fit.

2. A linear friction welding machine according to claim 1 wherein the table comprises a stationary table, wherein the weld head is configured to be aligned with the stationary table along a direction orthogonal to the stationary table, wherein the weld head is configured to controllably position the second workpiece along an axis orthogonal to the stationary table, and wherein the weld head is configured to linearly oscillate the second workpiece in a direction along a plane defined by the stationary table.

3. A linear friction welding machine according to claim 2 wherein the socket and the collet have a symmetry axis located along the axis orthogonal to the stationary table such that the collet and the socket are configured to permit clocking of the collet to any angular position relative to the socket about the symmetry axis.

4. A linear friction welding machine according to claim 2 wherein the linear friction welding machine is a two-axis linear friction welding machine.

5. A linear friction welding machine according to claim 1 wherein the table comprises a movable table configured to support and controllably position the first workpiece along a plane defined by first and second linear axes in order to align the first and second workpieces, wherein the weld head is adapted to controllably position the second workpiece along a third axis orthogonal to the first and second axes, and wherein at least one of the weld head and the movable table is configured to linearly oscillate in a direction along the plane.

6. A linear friction welding machine according to claim 5 wherein the socket and the collet have a symmetry axis located along the third axis such that the collet is configured to permit clocking of the collet to any angular position relative to the socket about the symmetry axis.

7. A linear friction welding machine according to claim 5 wherein the linear friction welding machine is a four-axis linear friction welding machine.

8. A linear friction welding machine according to claim 1 wherein the tapered cylindrical opening defined by the socket has a frustoconical shape, and wherein the tapered cylindrical collet has a frustoconical shape.

9. A collet comprising:
a body extending from a first end to an opposed second end and defining a tapered cylindrical shape, wherein the first end of the body defines external threads and wherein the body comprises an exterior surface that is inwardly tapered from proximate the externally threaded first end to the second end, opposite the first end;
a plurality of jaws, proximate the first end of the body, configured to be controllably positioned relative to one another so as to engage and securely hold a workpiece; and
a collar configured to be positioned about the first end of the body and to be threadably positioned relative to the body in order to controllably position the plurality of jaws relative to one another, wherein the collar is internally threaded and is configured to threadably engage the externally threaded first end of the body during a friction welding operation.

10. A collet according to claim 9 wherein the body defines a frustoconical shape that tapers down from the first end to the opposed second end.

11. An assembly comprising:
a socket defining a tapered cylindrical opening; and
a tapered cylindrical collet configured to retain a workpiece, wherein the collet is adapted to engage the tapered cylindrical opening defined by the socket so as to permit controlled, continuous clocking of the workpiece retained by the collet relative to the socket, wherein:
the tapered cylindrical opening comprises an interior surface that is inwardly tapered from a first end of the socket toward a second end of the socket, located opposite the first end, and
the tapered cylindrical collet is configured to be snugly received within the tapered cylindrical opening of the socket from the first end of the socket so as to be secured in the tapered cylindrical opening during a friction welding operation with a wobble-free fit.

12. An assembly according to claim 11 wherein the tapered cylindrical opening defined by the socket has a frustoconical shape, and wherein the tapered cylindrical collet has a frustoconical shape.

13. An assembly according to claim 11 wherein the socket and the collet define a symmetry axis such that the collet and socket are configured to permit clocking of the workpiece retained by the collet to any angular position relative to the socket about the symmetry axis.

14. A method of joining two workpieces using linear friction welding, the method comprising:
clamping one of the workpieces in a collet which has a tapered cylindrical shape;

positioning the collet at least partially within a tapered cylindrical opening defined by a socket associated with either a weld head or a table;

aligning the two workpieces;

clocking the collet relative to the socket to achieve an angular orientation between the workpieces;

following clocking of the collet relative to the socket, more fully seating the collet within the socket such that the tapered cylindrical collet is snugly received within the tapered cylindrical opening of the socket so as to be secured in the tapered cylindrical opening with a wobble-free fit;

controllably positioning the weld head and the workpiece retained thereby along an axis orthogonal to the table to bias the two workpieces against each other; and linearly oscillating at least one of the weld head and the table in a direction along a plane defined by the table to friction weld the two workpieces together.

15. A method according to claim 14 wherein the table comprises a stationary table, and wherein linearly oscillating at least one of the weld head and the table comprises linearly oscillating the weld head relative to the table.

16. A method according to claim 14 wherein the table comprises a movable table, and wherein aligning the two workpieces comprises translating the movable table along a plane defined by first and second orthogonal axes.

17. A method according to claim 16 wherein controllably positioning the weld head and the workpiece retained thereby comprises controllably positioning the weld head and the workpiece retained thereby along a third axis orthogonal to the first and second axes.

18. A method according to claim 14 further comprising separating the collet and the socket following friction welding of the two workpieces by pushing the collet from the socket or by pulling the collet from the socket.

19. A method according to claim 14 wherein the tapered cylindrical opening defined by the socket has a frustoconical shape, and wherein the tapered cylindrical shape of the collet is a frustoconical shape.

\* \* \* \* \*